US010245927B1

(12) United States Patent
Royer

(10) Patent No.: US 10,245,927 B1
(45) Date of Patent: Apr. 2, 2019

(54) METHOD AND APPARATUS FOR A TARPAULIN FASTENING SYSTEM

(71) Applicant: Royer Ent., LLC, Payson, AZ (US)

(72) Inventor: Rad Allen Royer, Longview, TX (US)

(73) Assignee: Royer Ent., LLC, Payson, AZ (US)

( * ) Notice: Subject to any disclaimer, the term of this patent is extended or adjusted under 35 U.S.C. 154(b) by 0 days.

(21) Appl. No.: 16/183,706

(22) Filed: Nov. 7, 2018

Related U.S. Application Data

(60) Provisional application No. 62/701,272, filed on Jul. 20, 2018.

(51) Int. Cl.
*B60P 7/04* (2006.01)
*B60J 7/06* (2006.01)
*F16H 19/06* (2006.01)

(52) U.S. Cl.
CPC ............ *B60J 7/064* (2013.01); *F16H 19/06* (2013.01)

(58) Field of Classification Search
CPC ......... B60P 7/04; B60P 7/0823; B60P 7/0846; B60P 7/0876; B60P 7/0807; B60P 7/0815; B60J 7/104
See application file for complete search history.

(56) References Cited

U.S. PATENT DOCUMENTS

| | | | | |
|---|---|---|---|---|
| 2,889,171 A * | 6/1959 | Morris | ............ | B60J 7/104 105/377.02 |
| 3,051,524 A * | 8/1962 | Palmer | ............ | B60J 7/104 296/100.17 |
| 4,523,784 A * | 6/1985 | Aspen | ............ | B60P 7/04 105/377.02 |
| 5,933,923 A * | 8/1999 | Catlos | ............ | A44B 11/02 24/196 |
| 6,059,499 A * | 5/2000 | Bird | ............ | B60P 7/083 410/103 |
| 6,302,469 B1 | 10/2001 | Jones | | |
| 6,626,621 B1 * | 9/2003 | Hugg | ............ | B60P 7/083 410/100 |
| 6,783,312 B2 | 8/2004 | Smith | | |
| 7,658,578 B1 | 2/2010 | Weibl | | |
| 8,192,119 B1 * | 6/2012 | Small | ............ | B60P 7/0846 410/103 |
| 8,376,674 B1 * | 2/2013 | Davis, III | ............ | B60P 7/0846 410/100 |

(Continued)

*Primary Examiner* — Hilary L Gutman
(74) *Attorney, Agent, or Firm* — Michael T. Wallace

(57) ABSTRACT

A tarpaulin fastening device includes a support frame for support of one or more winch/spool assemblies and associated interconnecting line cord. The interconnecting line cord is extracted/retracted from/to its respective winch/spool assembly through actuation of a gear assembly. The interconnecting line cord is woven through eyelets of one or more connection pins and terminated with an anchoring mechanism. Once extracted from the winch/spool assembly, the interconnecting line cord is anchored to a flatbed trailer using the anchor mechanism and each connection pin is alternatingly connected to connection points along a length of tarp covering a payload supported by the flatbed and to connection points along a length of the flatbed trailer. Once the interconnecting line cord is anchored and connected to the tarp and flatbed, the tarp is secured onto the payload by actuation of the gear assembly.

7 Claims, 9 Drawing Sheets

(56) References Cited

U.S. PATENT DOCUMENTS

| | | | | |
|---|---|---|---|---|
| 2001/0038778 A1* | 11/2001 | Tatina | ............... | B60P 7/083 |
| | | | | 410/100 |
| 2003/0190209 A1* | 10/2003 | Smith | ............... | B60J 7/104 |
| | | | | 410/97 |
| 2014/0086699 A1* | 3/2014 | Adams | ............ | B60P 7/0823 |
| | | | | 410/106 |
| 2014/0110520 A1* | 4/2014 | Hampson | ......... | B60P 7/0846 |
| | | | | 242/395 |
| 2016/0089964 A1* | 3/2016 | Rettig | ............ | B60P 7/0876 |
| | | | | 296/98 |

\* cited by examiner

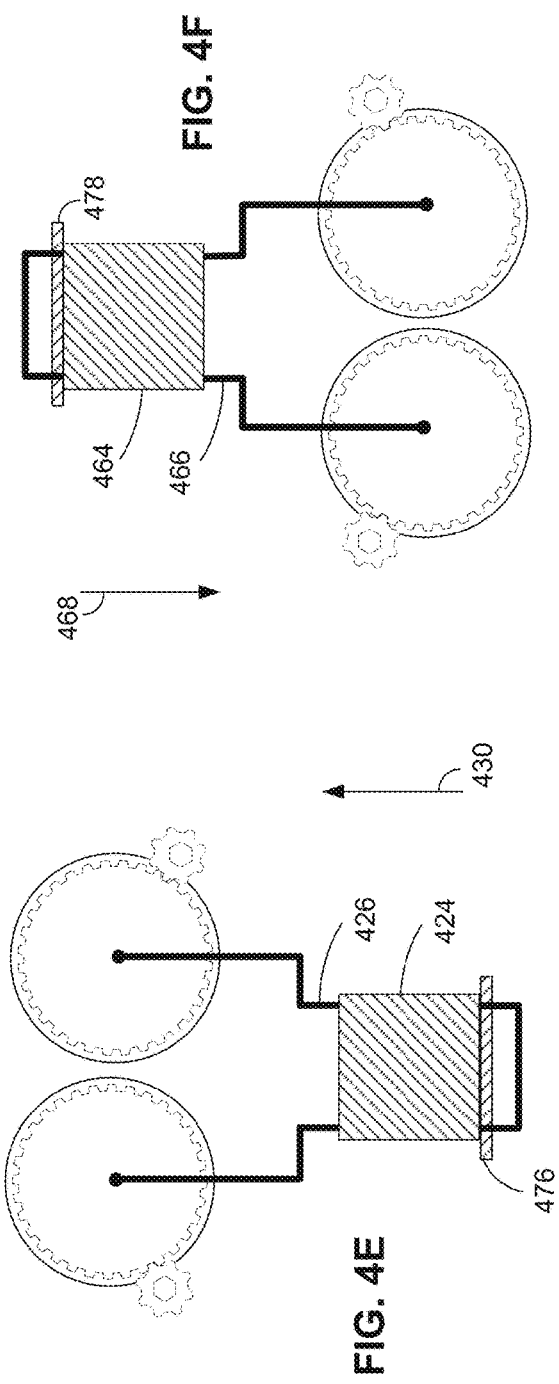
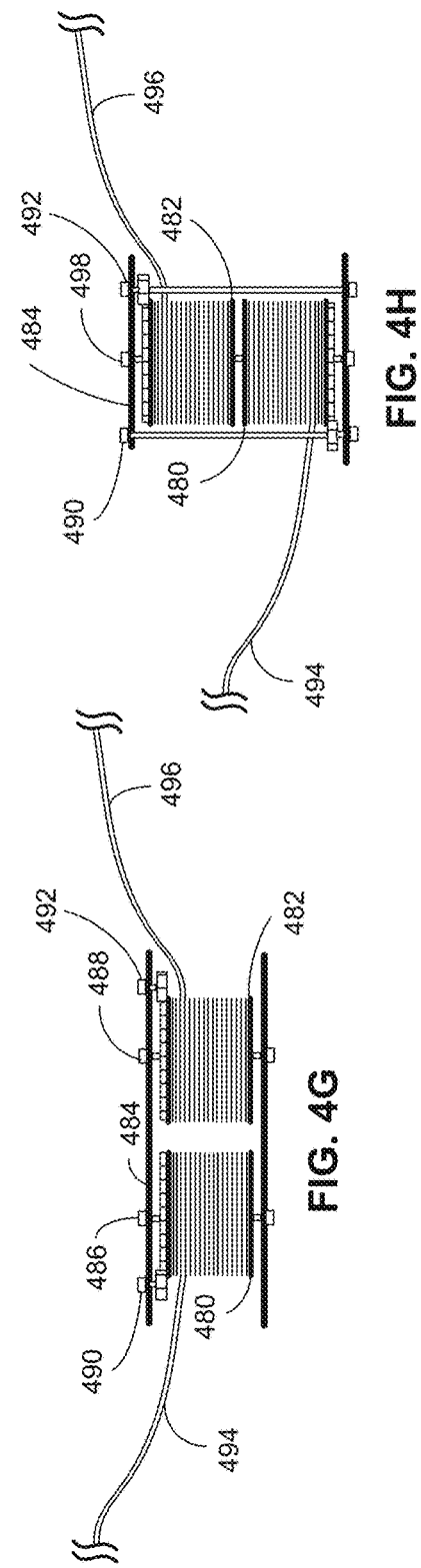

METHOD AND APPARATUS FOR A TARPAULIN FASTENING SYSTEM

FIELD OF THE INVENTION

The present invention generally relates to tarpaulin fastening systems, and more particularly to tarpaulin fastening systems for use in the transportation industry.

BACKGROUND

The transportation industry has been and continues to be an indispensable component of United States commerce. In 2015, for example, the U.S. transportation system moved a daily average of about 49.3 million tons of freight valued at more than $52.5 billion according to the U.S. Department of Transportation, Bureau of Transportation Statistics and Federal Highway Administration, Freight Analysis Framework, Version 4.3.1, 2017 (BTS). The largest component of the U.S. transportation system in 2015 according to the BTS was the trucking industry, responsible for a daily average of about 10.8 million tons of freight at a value of about $12 billion and is expected to increase by about 1.4% per year between 2015 and 2045.

The top 10 commodities by weight according to the BTS are comprised entirely of bulk products, which accounted for 67.3 percent of total tonnage transported, much of which may require flatbed transport due in part to the method by which such bulk products may be loaded onto the truck (e.g., bulk products loaded via fork lift along one or more sides of the flatbed) as well as the nature by which such bulk products may not conform to the exact dimensions of an enclosed semi-trailer (e.g., extension of bulk products beyond the standard length, height and/or width of an enclosed semi-trailer).

Depending upon weather and other factors such as bill of lading requirements, such bulk products transported via flatbed semi-trailers, in addition to the tiedowns required for the securement of the bulk products, may also be required to be protected from environmental conditions (e.g., wind, rain, sleet, snow and sunlight) via a protective layer (e.g., a tarpaulin sheet or cover abbreviated "tarp"). Such a tarp may be required to extend along the top, front, back and/or sides of the payload for environmental protection, which may further require that the tarp be secured to the payload during transport.

Conventional securement systems used to fasten a tarp to a payload generally include a system of flexible straps (e.g., bungee cords) with metal hooks on each end such that a hook on one end of the flexible strap may engage the tarp at certain attachment points (e.g., via a metal grommet or D-ring embedded within the tarp) and a hook on the other end of the flexible strap to engage an attachment point of the flatbed semi-trailer (e.g., a bottom edge of a rubrail of the flatbed semi-trailer).

A typical flatbed semi-trailer may, for example, require a number (e.g., 80) of such bungee cords to secure a tarp onto a standard-size payload. Accordingly, several tens of minutes (e.g., up to 30 minutes or more) may be required to secure such a tarp onto a standard-size payload of a flatbed semi-trailer using a conventional system of bungee cords.

Along with the amount of time required to secure a tarp with an adequate number of bungee cords are certain other undesirable characteristics related to bungee-cord-based fastening systems, which among others, include the safety hazard presented by the unexpected release of stored energy within the elastic portion of a bungee cord. Such an unexpected stored energy release may cause a safety hazard that may, for example, be created by the propulsion and resulting flailing of the hooks of the bungee cords during such an unexpected stored energy release. Such safety hazards may, for example, be unexpectedly created when the hooks pull out of the user's hand when the user attempts to set the hook into the attachment point while the bungee cord is under tension, or when the hook unexpectedly releases from the attachment point, or when the attachment point fails, or when the hook fails, or when the elastic portion of the bungee cord fails or when the hook releases from the elastic portion of the bungee cord, to name only a few bungee-cord-based fastening system failure modes. Further, according to the Jun. 11, 2000, issue of UPI Science News, doctors testifying before a public health committee at the annual meeting of the American Medical Association in Chicago, Ill., confirm that multiple incidences of severe eye damage have been caused by the safety hazards presented by bungee cords. The testifying doctors report that in many instances surgery is required, but the patient often does not regain complete visual acuity and on occasion, requires the complete removal of the injured eye.

Accordingly, the use of bungee-cord-based fastening systems continues to plaque the trucking industry as a major safety hazard and time consuming activity. Efforts continue, therefore, to develop a tarp fastening system for the already large and ever growing trucking industry that is much safer and that drastically reduces the amount of actuation time as compared to conventional bungee-cord-based fastening systems.

SUMMARY

To overcome limitations in the prior art, and to overcome other limitations that will become apparent upon reading and understanding the present specification, various embodiments of the present invention disclose methods and apparatus for tarpaulin fastening systems that substantially eliminate safety hazards associated with conventional tarpaulin fastening systems while substantially reducing the actuation time required by such conventional tarpaulin fastening systems.

In accordance with one embodiment of the invention, a tarp fastening system comprises a flatbed trailer, including at least one mechanical support structure, a rubrail, a payload and a tarp arranged to cover the payload. The tarp fastening system further includes one or more tarp fastening devices removably coupled to the at least one mechanical support structure, each of the one or more tarp fastening devices including a support frame, a spool coupled to the support frame, an interconnecting line cord coupled to the spool, a plurality of connection pins coupled to the interconnecting line cord and a gear assembly coupled to the spool. The plurality of connection pins are removably coupled to the tarp and the rubrail and the gear assembly is configured to retract the interconnecting line cord into the spool to secure the tarp to the payload.

In accordance with another embodiment of the invention, a tarp fastening system comprises a flatbed trailer including a stake pocket and a rubrail, a payload supported by the flatbed trailer, the payload being covered by a tarp, means for securing a tarp fastening device to the stake pocket, means for interconnecting the tarp fastening device to the tarp and the rubrail and means to fasten the tarp onto the payload.

In accordance with another embodiment of the invention, a method of fastening a tarp to a payload comprises supporting a payload with a flatbed trailer, covering the payload with a tarp, removably coupling a tarp fastening device to the flatbed trailer, interconnecting a line cord of the tarp fastening device between connection points along the flatbed trailer and the tarp and actuating a gear assembly of the tarp fastening device to create tension on the line cord to fasten the tarp onto the payload.

BRIEF DESCRIPTION OF THE DRAWINGS

Various aspects and advantages of the invention will become apparent upon review of the following detailed description and upon reference to the drawings in which:

FIGS. 4E and 4F illustrate various orientations and latching mechanisms of the tarp fastening device of FIG. 3 in accordance with alternate embodiments of the present invention;

FIG. 4G illustrates a plan view of the tarp fastening device of FIG. 3 with an in-line winch orientation in accordance with one embodiment of the present invention;

FIG. 4H illustrates a plan view of a tarp fastening device with a parallel winch orientation in accordance with an alternate embodiment of the present invention;

DETAILED DESCRIPTION

Figure 1:
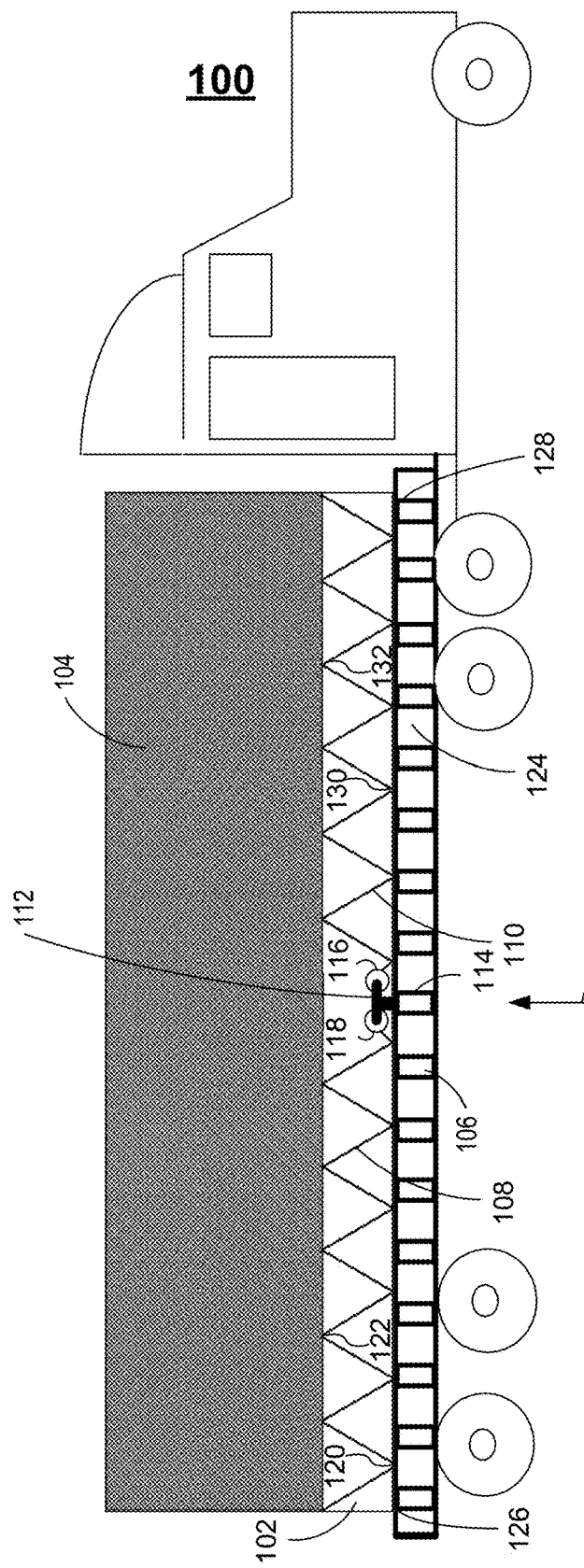
FIG. 1 illustrates a flatbed semi-trailer that incorporates a tarp fastening device in accordance with one embodiment of the present invention.

Generally, the various embodiments of the present invention are applied to tarpaulin (abbreviated "tarp") fastening systems that allow an interconnecting line cord (e.g., a light weight nylon rope such as parachute cord abbreviated "paracord" or ultra-high-molecular-weight polyethylene fiber rope such as Dyneema® and Spectra® brand fiber rope) of a tarp fastening device to be fully engaged with the tarp and the payload support structure (e.g., a flatbed semi-trailer) while the interconnecting line cord remains under no load. That is to say, for example, that substantially zero stored energy may exist within the interconnecting line cord while the interconnecting line cord may be interconnected between the tarp and the flatbed semi-trailer.

In one embodiment, a full length of the interconnecting line cord may be stowed within a spool of the tarp fastening device, such that any length (e.g., between a zero length and a full length) of the interconnecting line cord may be extracted from the spool during the actuation process. A winch may also be provided that may include a gear assembly and a gear locking mechanism, which may allow the interconnecting line cord to be extracted from the spool and retracted back into the spool in a controlled manner with a mechanical and/or electrical advantage. The winch, for example, may either be actuated manually (e.g., via a mechanical lug nut driven by a lug wrench or a power socket wrench) or actuated electrically (e.g., via an electric motor) to facilitate the extraction and retraction of the interconnecting line cord from/to the spool.

The spool, interconnecting line cord, gear assembly and gear locking mechanism of the tarp fastening device may each be supported by a support frame having a form factor that may be compatible with pre-existing mechanical support structures of a flatbed semi-trailer (e.g., the multiple stake pockets available on virtually all flatbed semi-trailers), which may allow the tarp fastening device to be anchored to any one of the multiple stake pockets via the tarp fastening device's support frame. Since the stake pockets of flatbed semi-trailers exhibit substantially universal dimensions (e.g., substantially universal height, width, depth and wall thickness dimensions), the tarp fastening device may be interchanged and made to be operable with virtually any flatbed semi-trailer now in operation, or any flatbed semi-trailer that may be placed into operation in the future (e.g., the tarp fastening device may be permanently anchored to newly constructed flatbed semi-trailers via bolt-on or welded means or removably anchored to the stake pockets of newly constructed semi-trailers).

In addition, multiple winch/spool assemblies (e.g., two winch/spool assemblies) may be accommodated by the tarp fastening device's support frame, whereby each of the multiple winch/spool assemblies may be independently attached to the support frame and used independently of one another. In one embodiment, for example, a support frame may accommodate two winch/spool assemblies and may be anchored within a single stake pocket that may exist at a position (e.g., a midpoint) of both sides of the flatbed semi-trailer, such that one or more tarps may be secured to the one or more payloads supported by the flatbed semi-trailer to protect the one or more payloads from environmental conditions.

In operation, a first interconnecting line cord may be extracted from the spool of the first winch/spool assembly that may be attached to the support frame and extended along a length of the flatbed semi-trailer (e.g., about half the length of the flatbed semi-trailer), whereby the extracted portion of the first interconnecting line cord may be attached to an endpoint of the flatbed semi-trailer (e.g., an anchor point such as a stake pocket located at the rear of the flatbed semi-trailer). Similarly, a second interconnecting line cord may be extracted from the spool of the second winch/spool assembly that may be attached to the support frame and extended along a length of the flatbed semi-trailer (e.g., about half the length of the flatbed semi-trailer), whereby the extracted portion of the second interconnecting line cord may be attached to an endpoint of the flatbed semi-trailer (e.g., an anchor point such as a stake pocket located at the front of the flatbed semi-trailer).

Once the interconnecting line cords of both spools have been extended and anchored, connection pins arranged along a length of each of the two interconnecting line cords may engage connection points along the length of the flatbed semi-trailer (e.g., along a bottom portion of the rubrail of the flatbed semi-trailer) and connection points along the length of the tarp (e.g., D-rings located along the length of the tarp). In one embodiment, connection pins connected along a length of each interconnecting line cord may be alternatingly connected, such that for example, a first connection pin may be connected to a D-ring of the tarp, a second connection pin may be connected to a bottom portion of the rubrail of the flatbed semi-trailer, a third connection pin may be connected to a D-ring of the tarp, a fourth connection pin may be connected to a bottom portion of the rubrail of the flatbed semi-trailer, and so on.

Once the interconnecting line cords of both spools of both winch/spool assemblies have been extended and anchored and once at least a portion of connection pins have been connected to their respective connection points, each winch of each winch/spool assembly may be actuated such that a length of each of the interconnecting line cords may be retracted back into each spool of each winch/spool assembly thereby decreasing a length of each interconnecting line cord that exists outside of each spool, which in turn increases the tension of each interconnecting line cord, thereby securing the tarp against the payload for protection against environmental conditions. An identical process may also be used to secure the tarp against the payload on the opposite side of the flatbed semi-trailer.

It should be noted that during the time that each interconnecting line cord of each spool of each winch/spool assembly is extended and anchored and while each connection pin is connected to its respective connection point, virtually no tension may exist on each of the interconnecting line cords. Accordingly, virtually no stored energy may be present while a user interconnects the tarp fastening device of the present invention to the associated tarp and flatbed semi-trailer, which may substantially eliminate any safety hazard that may otherwise result from the unintended release of any stored energy and any resultant injury that may be caused by such safety hazards that may be present in conventional tarp fastening systems (e.g., bungee-cord-based fastening systems).

In an alternate embodiment, the support frame that may accommodate multiple winch/spool assemblies may be mounted in an inverted orientation in any stake pocket that may be selected by the user. Such an orientation may, for example, lend itself well to provide additional clearance along a surface of the flatbed semi-trailer that may be supporting a payload that may extend past a width of the surface of the flatbed semi-trailer.

In such instances, for example, such a payload may extend beyond a width of a surface of the flatbed semi-trailer, such that the payload may make physical contact with the tarp fastening device if the tarp fastening device were to be mounted right-side up in a corresponding stake pocket. The tarp fastening device, therefore, may instead be mounted up-side down in the corresponding stake pocket, thereby removing the tarp fastening device from any form of physical contact with the payload while simultaneously maintaining full functionality of the tarp fastening device notwithstanding the oversized payload.

In an alternate embodiment, a payload may not extend along the full length of a flatbed semi-trailer, but may instead extend along only a portion of the length. In such an instance, it may not be necessary to utilize both winch/spool assemblies of the tarp fastening device. Accordingly, the support frame of the tarp fastening device may be anchored within a stake pocket that may be situated in proximity to an endpoint or a midpoint of the payload (e.g., at a midpoint along a length of the flatbed semi-trailer that corresponds to an endpoint of the payload) whereby only half of the tarp fastening device may need to be deployed.

As a result, a first interconnecting line cord may be extracted from the first winch/spool assembly that may be attached to the support frame and extended along a length of the flatbed semi-trailer that may be supporting the payload (e.g., about half the length of the flatbed semi-trailer), whereby the interconnecting line cord may be attached to an endpoint of the flatbed semi-trailer (e.g., an anchor point such as a stake pocket located at the front or back of the flatbed semi-trailer). Since the second winch/spool assembly may not be deployed in this embodiment, the second interconnecting line cord may be stowed within the second winch/spool assembly, thereby remaining unused during transport of the payload.

In other embodiments, a support frame may accommodate a single winch/spool assembly. In such an instance, one or more support frames may be anchored within corresponding one or more stake pockets to provide tarp fastening devices for one or more sections of one or more payloads as may be required for a particular application.

In still other embodiments, a support frame may accommodate multiple (e.g., two) winch/spool assemblies that may be arranged in-line such that each winch/spool assembly may rotate about separate axles. Alternately, a support frame may accommodate multiple (e.g., two) winch/spool assemblies that may be arranged in parallel such that each winch/spool assembly may rotate independently about a common axle.

Turning to FIG. 1, flatbed semi-trailer 100 is exemplified, which may include flatbed 124 that may be used to support payload 102. Payload 102 may be strapped to flatbed 124 using tiedowns (not shown) in order to secure payload 102 to a surface of flatbed 124 to substantially prevent payload 102 from shifting during transport. In addition, payload 102 may be covered by tarp 104 so that payload 102 may be protected from environmental conditions (e.g., wind, rain, sleet, snow and sunshine) during transport.

A tarp fastening device of FIG. 1 may include a multiple winch/spool assembly having first winch/spool assembly 118 and second winch/spool assembly 116 that may be mounted to support frame 112. As illustrated, support frame 112 may be anchored within a mechanical support structure (e.g., stake pocket 114) that may pre-exist on flatbed 124. It should be noted that support frame 112 may also be anchored within any one of any other stake pocket 106 that may pre-exist along a length of flatbed 124 as well. Alternately, support frame 112 may be permanently attached (e.g., bolted or welded) to any point along flatbed 124.

The tarp fastening device of FIG. 1 may further include interconnecting line cord 108 that may be extracted from and retracted back into winch/spool assembly 118 and interconnecting line cord 110 that may be extracted from and retracted back into winch/spool assembly 116. To achieve the configuration exemplified in FIG. 1, interconnecting line cords 108 and 110 may undergo a two-part process. First, interconnecting line cords 108 and 110 may, for example, be extracted from winch/spool assemblies 118 and 116, respectively, and then anchored to respective anchor points (e.g., stake pockets 126 and 128) via anchor assemblies (not shown) that may be connected to the ends of interconnecting line cords 108 and 110. Next, interconnecting line cords 108 and 110 may, for example, be alternatingly connected to tarp connection points 122 and 132 (e.g., D-rings not shown), respectively, and to flatbed connection points 120 and 130

(e.g., a bottom side of a rubrail of flatbed 124 not shown), respectively, via connection pins as discussed in more detail below.

It should be noted that during the time that each interconnecting line cord 108 and 110 of each respective winch/spool assembly 118 and 116 is extracted and anchored and while each connection pin is connected to its respective connection point, virtually no tension may exist on either of interconnecting line cords 108 and 110. Accordingly, virtually no stored energy may be present while a user interconnects the tarp fastening device of FIG. 1 to tarp 104 and flatbed 124.

Subsequently, the user may cause tension to be placed on interconnecting line cords 108 and 110 through the actuation (e.g., mechanical actuation or electro/mechanical actuation) of winch/spool assemblies 118 and 116, respectively, which may cause the slack of respective interconnecting line cords 108 and 110 to be retracted back into respective winch/spool assemblies 118 and 116, thereby securing tarp 104 onto payload 102 to completely cover payload 102 during transport. An identical tarp fastening device (not shown) may exist on the opposite side of flatbed semi-trailer 100 and may operate as discussed above in order to complete the securement of tarp 104 onto the opposite side of payload 102. Front and back fastening systems, as discussed in more detail below in relation to FIGS. 8A and 8B, for example, may be used to complete the securement of tarp 104 onto the front and/or back portions of payload 102.

A locking mechanism (not shown) as discussed in more detail below may be utilized to maintain the position of support frame 112 within stake pocket 114 while tension exists on interconnecting line cords 108 and 110. In particular, tension on interconnecting line cords 108 and/or 110 may tend to cause force vector 134 to act on support frame 112, thereby tending to cause support frame 112 to be pulled from stake pocket 114 in the direction of force vector 134. Utilization of the locking mechanism (not shown), however, may counteract force vector 134 to maintain the securement of support frame 112 within stake pocket 114 while tension exists on interconnecting line cords 108 and/or 110.

Figure 2:
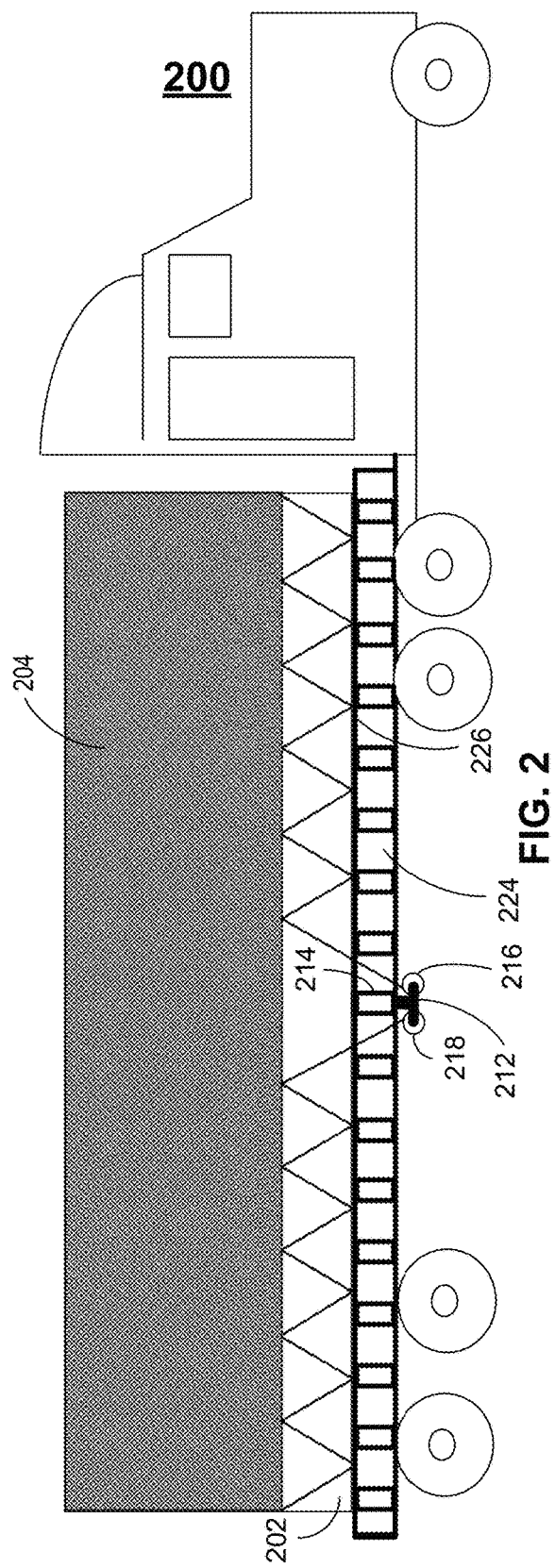
FIG. 2 illustrates a flatbed semi-trailer that incorporates a tarp fastening device in accordance with an alternate embodiment of the present invention.

Turning to FIG. 2, flatbed semi-trailer 200 is exemplified to include an alternate embodiment of a tarp fastening device, which may be useful in those instances that payload 202 may extend beyond a width of surface 226 of flatbed 224 that supports payload 202. In such instances, support frame 212 and corresponding winch/spool assemblies 218 and 216 may be mounted within a corresponding mechanical support structure (e.g., stake pocket 214 of flatbed 224) in an inverted orientation so as to remove any tendency for payload 202 to physically impede the operation of the tarp fastening device.

In particular, since support frame 212 and corresponding winch/spool assemblies 218 and 216 may be disposed in a manner that may not intersect the plane formed by support surface 226 of flatbed 224, no amount of width overlap of payload 202 on support surface 226 may impede the operation of winch/spool assemblies 218 and 216. Other aspects of the tarp fastening device as discussed above in relation to FIG. 1 may be identical to the operation of the tarp fastening device as exemplified in FIG. 2.

Figure 3:
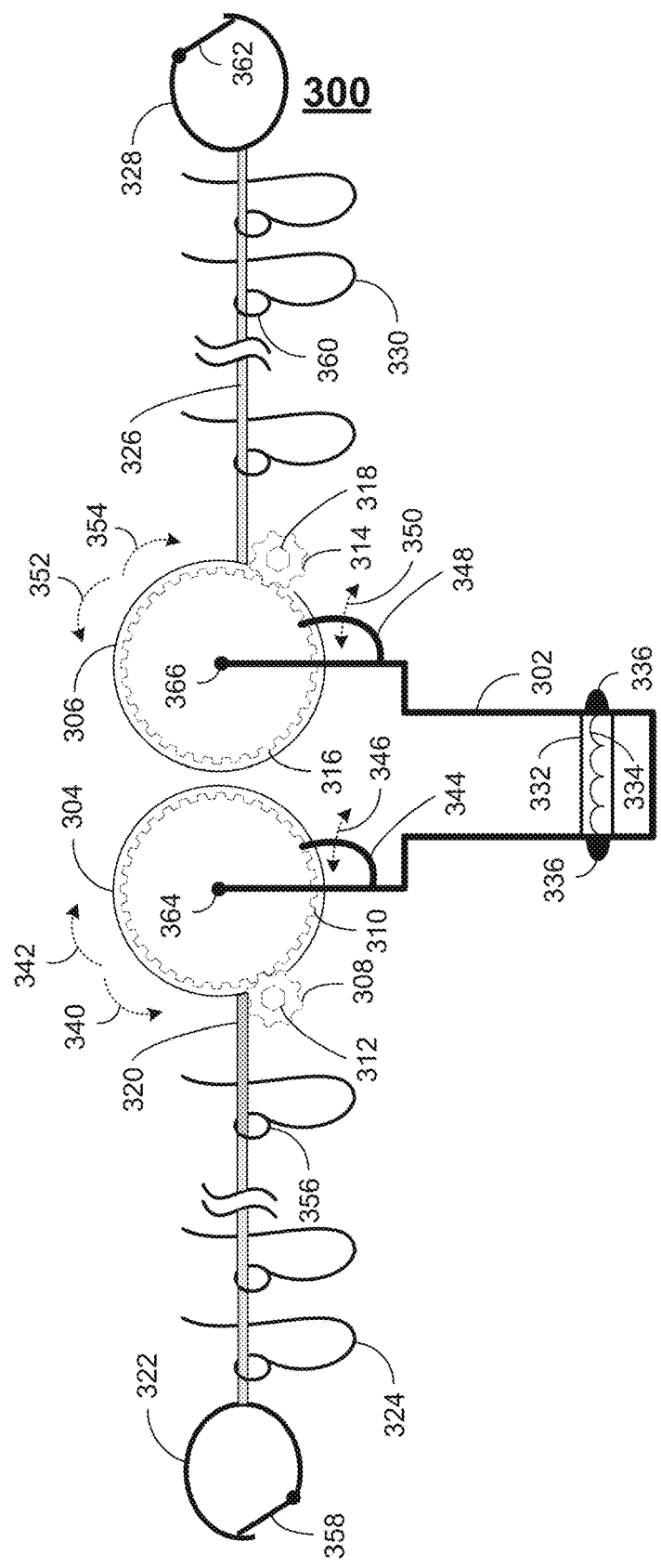
FIG. 3 illustrates the tarp fastening device of FIGS. 1 and 2 in accordance with one embodiment of the present invention.

Turning to FIG. 3, tarp fastening device 300 is exemplified, which may include support frame 302 and corresponding winch/spool assemblies 304 and 306 (portions of support frame 302 and corresponding winch/spool assemblies 304 and 306 have been removed for ease of discussion and clarity). As discussed above, each winch/spool assembly 304 and 306 may include respective interconnecting line cords 320 and 326, respectively, that may be extracted and retracted upon actuation of a gear assembly of each winch/spool assembly 304 and 306.

In particular, winch/spool assembly 304 may include main gear 310, driving gear 308 and driving lug 312 that may support actuation of winch/spool assembly 304 to rotate in either of directions 340 and/or 342 about axle 364. For example, driving gear 308 may be connected to support frame 302 (connections not shown) in a manner that allows rotation of driving gear 308 in counter-clockwise direction 340 (e.g., by applying a lug wrench or a power socket wrench onto driving lug 312 and manually turning driving gear 308 in counter-clockwise direction 340 or by actuating an electric motor (not shown)), which in turn may cause main gear 310 to rotate in clockwise direction 342. Alternately, or in addition, driving gear 308 may be connected to support frame 302 (connections not shown) in a manner that allows rotation of driving gear 308 in clockwise direction 342 (e.g., by applying a lug wrench or a power socket wrench onto driving lug 312 and manually turning driving gear 308 in clockwise direction 342 or by actuating an electric motor (not shown)), which in turn may cause main gear 310 to rotate in counter-clockwise direction 340. In response, interconnecting line cord 320 may either be extracted from or retracted into winch/spool assembly 304 depending upon the direction (e.g., clockwise or counter-clockwise) that interconnecting line cord 320 may be spooled onto winch/spool assembly 304. Locking mechanism 344 may engage/disengage main gear 310 (or alternately may engage/disengage driving gear 308) through rotation of locking mechanism 344 in direction 346. When engaged, for example, rotation of winch/spool assembly 304 may be prevented by locking mechanism 344. When locking mechanism 344 may be disengaged, for example, winch/spool assembly 304 may be allowed to rotate about axle 364.

Similarly, winch/spool assembly 306 may include main gear 316, driving gear 314 and driving lug 318 that may provide actuation of winch/spool assembly 306 to rotate in either of directions 352 and/or 354 about axle 366. For example, driving gear 314 may be connected to support frame 302 (connections not shown) in a manner that allows rotation of driving gear 314 in counter-clockwise direction 352 (e.g., by applying a lug wrench or a power socket wrench onto driving lug 318 and manually turning driving gear 314 in counter-clockwise direction 352 or by actuating an electric motor (not shown)), which in turn may cause main gear 316 to rotate in clockwise direction 354. Alternately, or in addition, driving gear 314 may be connected to support frame 302 (connections not shown) in a manner that allows rotation of driving gear 314 in clockwise direction 354 (e.g., by applying a lug wrench or a power socket wrench onto driving lug 318 and manually turning driving gear 314 in clockwise direction 354 or by actuating an electric motor (not shown)), which in turn may cause main gear 316 to rotate in counter-clockwise direction 352. In response, interconnecting line cord 326 may either be extracted from or retracted into winch/spool assembly 306 depending upon the direction (e.g., clockwise or counter-clockwise) that interconnecting line cord 326 may be spooled onto winch/spool assembly 306. Locking mechanism 348 may engage/disengage main gear 316 (or alternately may engage/disengage driving gear 314) through rotation of locking mechanism 348 in directions 350. When engaged, for example, rotation of winch/spool assembly 306 may be prevented by locking mechanism 348. When locking mechanism 348 may be disengaged, for example, winch/spool assembly 306 may be allowed to rotate about axle 366.

Interconnecting line cord 320 may be threaded through eyelet 356 of one or more connection pins 324 and terminated into anchor mechanism 322 as shown. Anchor mechanism 322 may include a spring-loaded latch 358 that may allow interconnecting line cord 320 to be anchored (e.g., anchored to anchor point 126 of flatbed 124 of FIG. 1). Similarly, interconnecting line cord 326 may be threaded through eyelet 360 of one or more connection pins 330 and terminated into anchor mechanism 328 as shown. Anchor mechanism 328 may include a spring-loaded latch 362 that may allow interconnecting line cord 326 to be anchored (e.g., anchored to anchor point 128 of flatbed 124 of FIG. 1).

Once anchor mechanisms 322 and/or 328 have been anchored to their respective anchor points, one or more connection pins 324 and/or 330 may be connected to their respective connection points as may be required. As per an example, interconnecting line cords 320 and/or 326 may, for example, be alternatingly connected to tarp connection points (e.g., tarp connection points 122 and 132 as discussed above in relation to FIG. 1), whereby connection pins 324 and/or 330 may, for example, engage a tarp connection point (e.g., connection pin 404 may engage tarp D-Ring 402 as exemplified in FIG. 4A) while simultaneously being connected to interconnecting line cords 320 and/or 326 (e.g., interconnecting line cord 408 may engage eyelet 406 as exemplified in FIG. 4A). Similarly, one or more interconnecting line cords 320 and/or 326 may, for example, be connected to flatbed connection points (e.g., flatbed connection points 120 and 130 as discussed above in relation to FIG. 1), whereby connection pins 324 and/or 330 may, for example, engage a flatbed connection point (e.g., connection pin 454 may engage rubrail 452 as exemplified in FIG. 4B) while simultaneously being connected to interconnecting line cords 320 and/or 326 (e.g., interconnecting line cord 458 may engage eyelet 456 as exemplified in FIG. 4B).

Figure 4A:
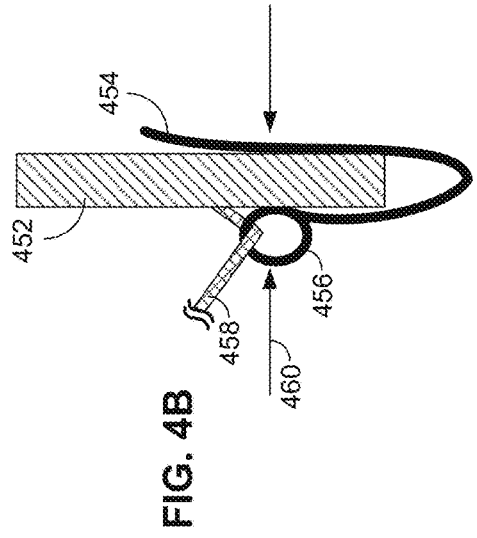
FIGS. 4A and 4B illustrate applications of a connection pin of the tarp fastening device of FIG. 3 in accordance with several embodiments of the present invention.
Figure 4B:
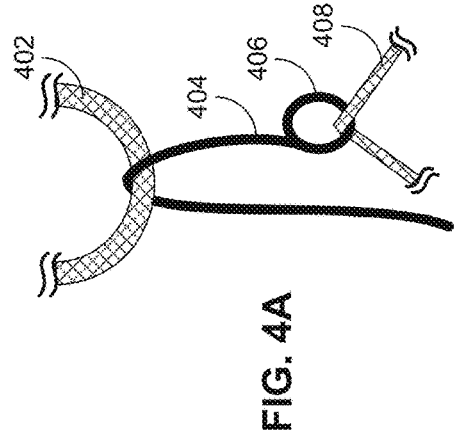

In one embodiment, therefore, connection pins 324 and/or 330 may be comprised of the same component (e.g., connection pins 404 and 454 as illustrated in FIGS. 4A and 4B). As a result, the complexity of tarp fastening device 300 may be reduced by reducing the number of different components required by tarp fastening device 300.

Furthermore, connection pins 324 and/or 330 may exhibit a clamp-like characteristic, whereby connection pins 324 and/or 330 may engage a connection point of a flatbed trailer in such a way so as to remain fixed once applied even without any tension being applied to the corresponding interconnecting line cord. Turning back to FIG. 4B, for example, connection pin 454 may engage a bottom side of rubrail 452 by exerting force vector 460 onto rubrail 452. Force vector 460 may, for example, be exerted by connection pin 454 by first exerting a force opposite to force vector 460 sufficient to slightly deflect connection pin 454 apart, thereby allowing sufficient width necessary to accept rubrail 452 as shown. Upon release of the force necessary to spread connection pin 454 apart, connection pin 454 may squeeze rubrail 454 as a result of a restoring force tending to return connection pin 454 to its undeflected position. As a result, connection pin 454 may remain connected to rubrail 452 even in the absence of any tension being applied to interconnecting line cord 458 via a tarp fastening device (e.g., tarp fastening device 300 of FIG. 3). Similarly as illustrated in FIG. 4A, each tarp connection point (e.g., tarp D-ring 402) may maintain all connection pins 404 in place in the absence of any tension being applied to interconnecting line cord 408 via a tarp fastening device (e.g., tarp fastening device 300 of FIG. 3).

As a result, for example, the operator of the associated flatbed semi-trailer may apply all connection pins 454 to rubrail 452 and all connection pins 404 to tarp D-rings 402 as may be required in a particular application, with a peace of mind that may come from the knowledge that force vector 460 may be used to maintain the position of each connection pin 454 onto rubrail 452 and tarp D-rings 402 may be used to maintain the position of each connection pin 404 before applying tension to the associated interconnecting line cord(s). Accordingly, the tarp fastening device (e.g., tarp fastening device 300 of FIG. 3) may be fully interconnected in the absence of any stored energy contained within the associated interconnecting line cord(s), thereby providing safe, effective and timely operation with virtually no safety hazards.

Turning back to FIG. 3, support frame 302 may exhibit a latching mechanism 332 that may be used to maintain the position of support frame 302 within the associated mechanical support structure (e.g., stake pocket 114 of FIG. 1 and stake pocket 214 of FIG. 2). In particular, locking mechanisms 336 may deploy (e.g., extend outwardly through operation of spring 334 as shown) once locking mechanisms 336 have cleared an interior width defined by the associated mechanical support structure.

Figure 4C:
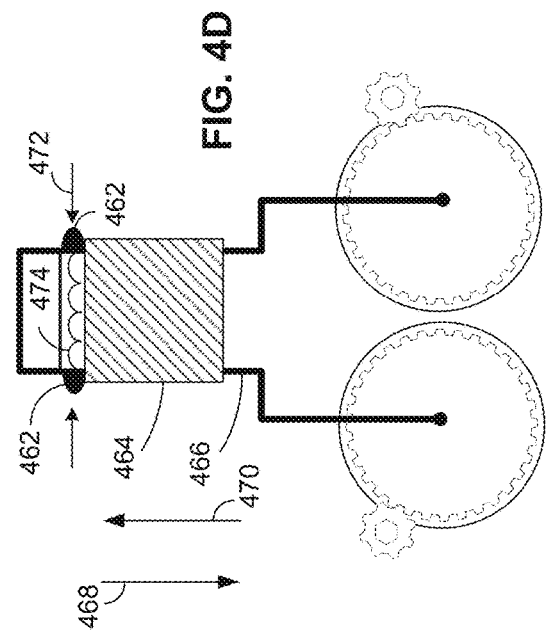
FIGS. 4C and 4D illustrate various orientations and latching mechanisms of the tarp fastening device of FIG. 3 in accordance with several embodiments of the present invention.

Turning to FIG. 4C, for example, support frame 426 is illustrated as being inserted into a corresponding mechanical support structure (e.g., stake pocket 424) of a corresponding flatbed semi-trailer (not shown) in a right-side up orientation (e.g., as discussed above in relation to the orientation of the tarp fastening device of FIG. 1). Support frame 426 may be inserted into stake pocket 424 in direction 428 until latching mechanisms 422 clear an interior width defined by stake pocket 424. Once cleared, a deployment mechanism (e.g., spring 434) may cause latching mechanisms 422 to extend outwardly to a position that may be wider than an exterior width dimension of stake pocket 424 as shown. As a result, any force vector 430 tending to pull support frame 426 out of stake pocket 424 in direction 430 may be defeated by operation of latching mechanisms 422. An operator of the corresponding flatbed semi-trailer may remove support frame 426 from stake pocket 424 simply by applying force vector 432 against latching mechanisms 422 until the deployment mechanism (e.g., spring 434) may be compressed enough to allow latching mechanisms 422 to clear an interior width of stake pocket 424, thereby allowing support frame 426 to be removed in direction 430.

Figure 4D:
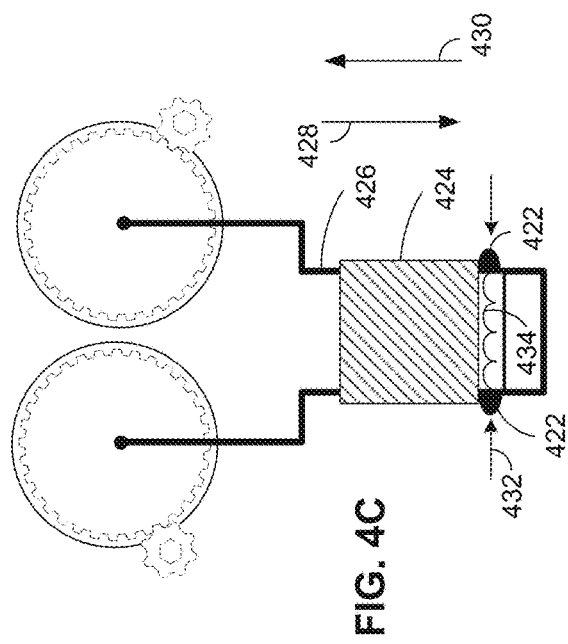

Turning to FIG. 4D, a portion of support frame 466 is exemplified as being inserted into a corresponding mechanical support structure (e.g., stake pocket 464) of a corresponding flatbed semi-trailer (not shown) in an up-side down orientation (e.g., as discussed above in relation to the orientation of the tarp fastening device of FIG. 2). Support frame 466 may be inserted into stake pocket 464 in direction 470 until latching mechanisms 462 clear an interior width defined by stake pocket 464. Once cleared, a deployment mechanism (e.g., spring 474) may cause latching mechanisms 462 to extend outwardly to a position that may be wider than an exterior width of stake pocket 464 as shown. As a result, any force vector 468 tending to pull support frame 466 out of stake pocket 464 in direction 468 may be defeated by operation of latching mechanisms 462. An operator of the corresponding flatbed semi-trailer may remove support frame 466 from stake pocket 464 simply by applying force vector 472 against latching mechanisms 462 until the deployment mechanism (e.g., spring 474) may be compressed enough to allow latching mechanisms 462 to clear an interior width of stake pocket 464, thereby allowing support frame 466 to be removed in direction 468.

In alternate embodiments, as exemplified in FIGS. 4E and 4F, support frames 426 and 466, respectively, may not include any latching mechanisms at all and may instead include apertures (not shown) through which locking pins 476 and 478, respectively, may be inserted. Locking pins 476 and 478 may, for example, include any device (e.g., a padlock, a trailer hitch lock or a trailer hitch pin) such that once inserted as shown, may prevent support frames 426 and 466, respectively, from being removed from respective mechanical support structures 424 and 464 in directions 430 and 468, respectively.

Turning to FIG. 4G, a plan view of a tarp fastening device (e.g., tarp fastening device 300 of FIG. 3) is exemplified, whereby winch/spool assemblies 480 and 482 may be mounted in-line onto support frame 484 via axles 486 and 488, respectively, thereby allowing the use of driving lugs 490 and 492, respectively, to extract and retract interconnecting line cords 494 and 496, respectively, through actuation of the respective gear assemblies associated with driving lugs 490 and 492 as discussed above.

In an alternate embodiment, as exemplified in FIG. 4H, a plan view of a tarp fastening device is exemplified, whereby winch/spool assemblies 480 and 482 may instead be mounted in parallel onto support frame 484 via single axle 498, thereby allowing the use of driving lugs 490 and 492, respectively, to extract and retract interconnecting line cords 494 and 496, respectively, through actuation of the respective gear assemblies associated with driving lugs 490 and 492.

Figure 5:
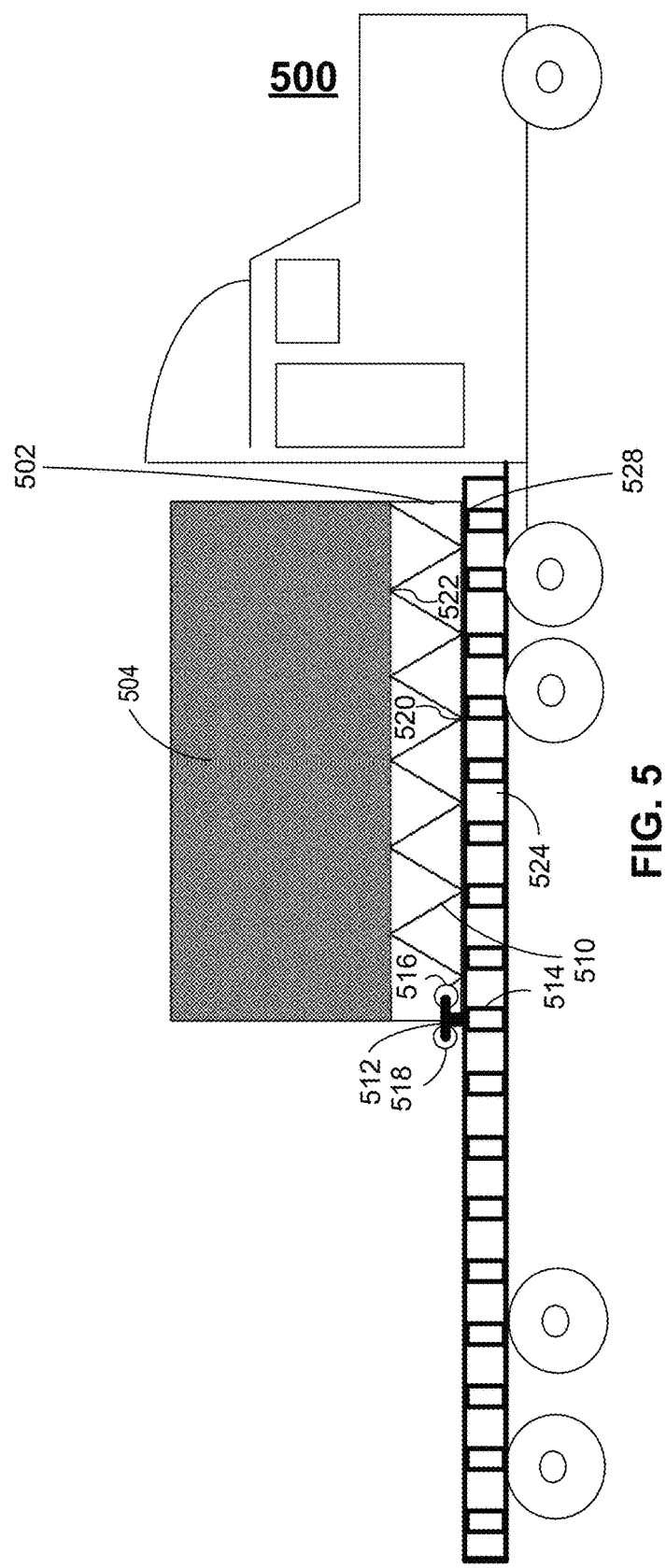
FIG. 5 illustrates a flatbed semi-trailer that incorporates a tarp fastening device in accordance with an alternate embodiment of the present invention

It should be noted that operation of winch/spool assemblies 304 and 306 of FIG. 3 may be operated independently of one another. As illustrated in FIG. 5, for example, payload 502 may not extend along the full length of flatbed 524 of flatbed semi-trailer 500, but may instead extend along only a portion of the length (e.g., half the length of flatbed 524). In such an instance, it may not be necessary to utilize both winch/spool assemblies 518 and 516 of the tarp fastening device. Accordingly, support frame 512 may be anchored within a mechanical support structure (e.g., stake pocket 514) that may be situated in proximity to an endpoint of the payload (e.g., at a midpoint along a length of the flatbed 524 that corresponds to an endpoint of payload 502), whereby only half of the tarp fastening device may be deployed.

As a result, first interconnecting line cord 510 may be extracted from first winch/spool assembly 516 and extended along a length of flatbed 524 that may be supporting payload 502 (e.g., about half the length of the flatbed 524), whereby interconnecting line cord 510 may be anchored to an endpoint of flatbed 524 (e.g., an anchor point such as stake pocket 528 located at the front of the flatbed 524) and alternatingly connected to tarp connection points 522 and flatbed connection points 520 (e.g., as discussed above in relation to tarp connection points and flatbed connection points of FIGS. 4A and 4B, respectively). Since second winch/spool assembly 518 may not be deployed in this embodiment, the second interconnecting line cord (not shown) may be retracted into second winch/spool assembly 518 for storage, thereby remaining unused during transport of payload 502.

In alternate embodiments, a tarp fastening system may include only a single winch/spool assembly, whereby for example, a support frame meant for two winch/spool assemblies (e.g., support frame 302 of FIG. 3) may only be allowed to receive a single winch/spool assembly (e.g., either winch/spool assembly 304 or winch/spool assembly 306). Conversely, a support frame (not shown) meant for a single winch/spool assembly may be arranged instead.

Figure 6:
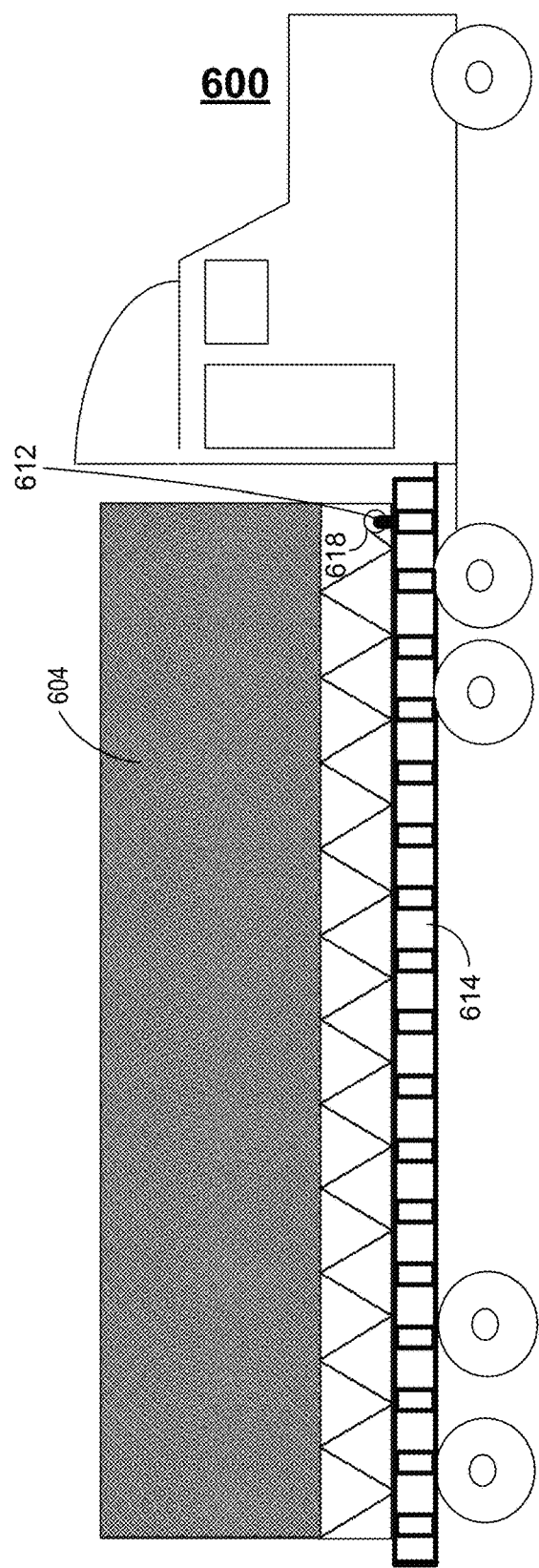
FIGS. 6-7 illustrate a flatbed semi-trailer that incorporates a tarp fastening device in accordance with alternate embodiments of the present invention.
Figure 7:
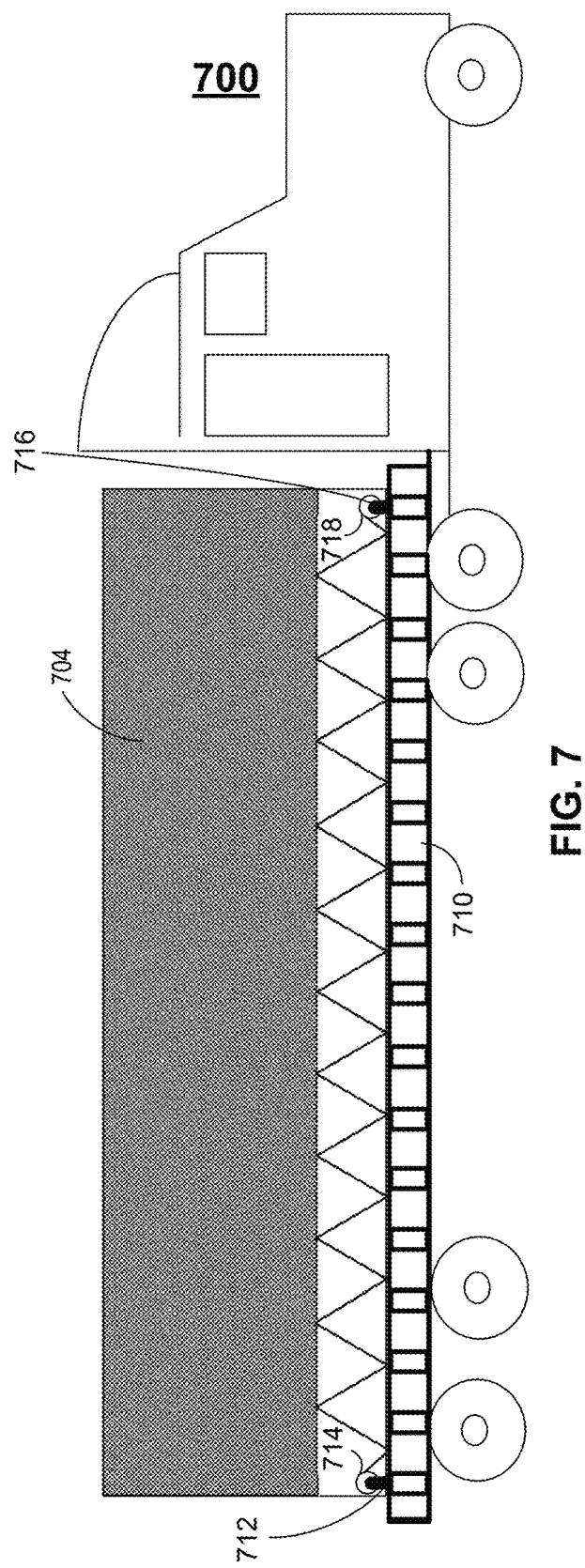

In such embodiments, winch/spool assemblies (e.g., 618 of FIG. 6 or 714 and 718 of FIG. 7) may be arranged on one or more support frames (e.g., one support frame 612 of FIG. 6 or two support frames 712/716, respectively, of FIG. 7) may be anchored within corresponding one or more stake pockets to provide tarp fastening systems for one or more sections of one or more payloads as may be required for a particular application. In such instances, a sufficient length of interconnecting line cord may be present within the respective winch/spool assembly to be interconnected to a tarp (e.g., tarp 604 and 704 of FIGS. 6 and 7 respectively) and the corresponding flatbed (e.g., flatbed 614 of FIG. 6 or flatbed 710 of FIG. 7) connection points as discussed above, for example, in relation to FIGS. 4A and 4B.

Figure 8B:
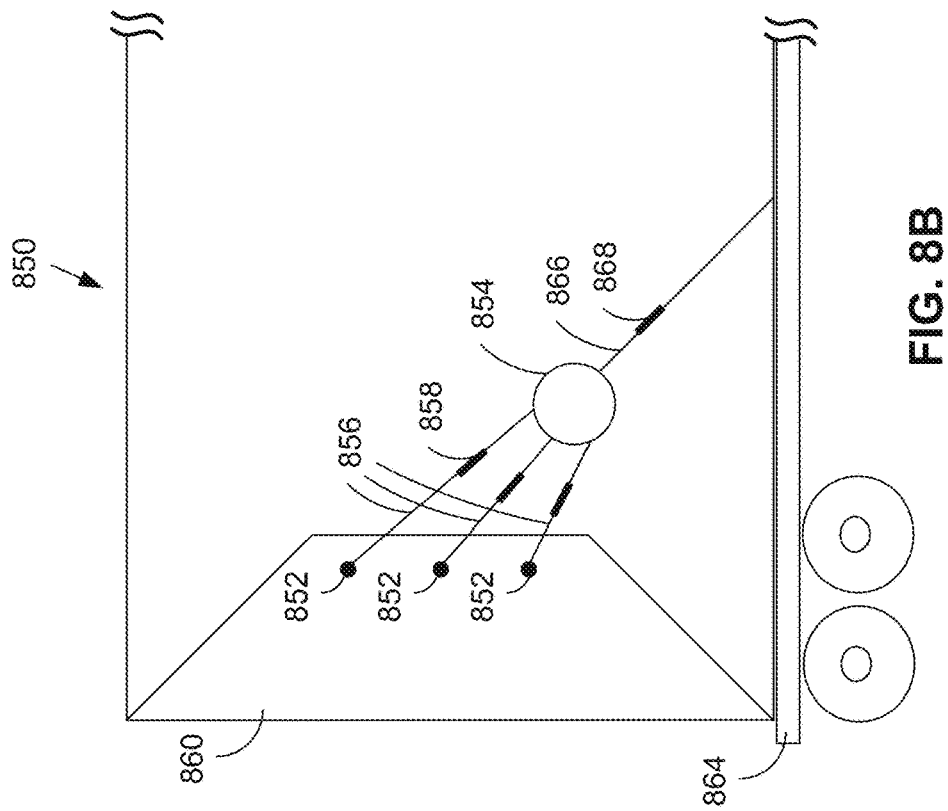
FIGS. 8A-8B illustrate end-point fastening systems in accordance with various embodiments of the present invention.
Figure 8A:
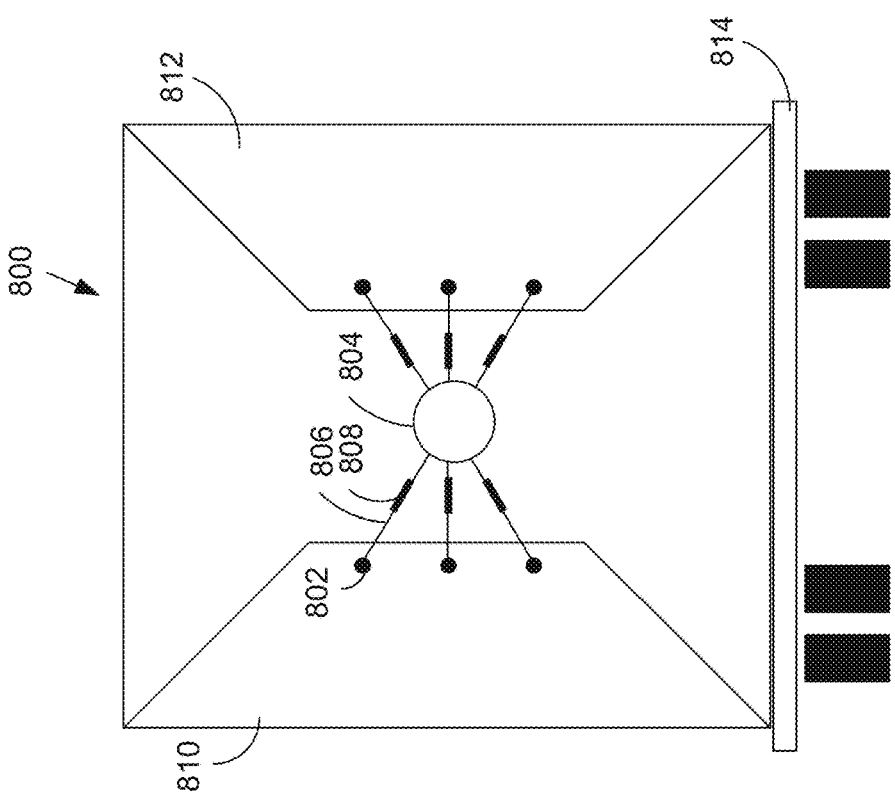

Turning to FIG. 8A, endpoint fastening system 800 is exemplified, whereby left side 810 of a tarp extending from a left side of a payload (not shown) supported by flatbed trailer 814 and right side 812 of a tarp extending from a right side of a payload (not shown) supported by flatbed trailer 814 may be fastened across an endpoint (e.g., the back end of a payload supported by flatbed trailer 814). As per an example, straps 806 may be extended between tarp connection points (e.g., D-Rings 802) to central hub 804, whereby the length of straps 806 may be adjusted using adjustment mechanisms (e.g., ratchet or clamp mechanisms 808) to bring tarp flaps 810 and 812 together and into securement against the payload (not shown). Accordingly, the back end of the payload may be protected from environmental conditions (e.g., wind, rain, sleet, snow and sunlight).

Turning to FIG. 8B, endpoint fastening system 850 is exemplified, whereby flap 860 of a tarp extending from a left side of a payload (not shown) supported by flatbed trailer 864 may be fastened behind an endpoint (e.g., the front end of a payload supported by flatbed trailer 864). As per an example, straps 856 may be extended between tarp connection points (e.g., D-Rings 852) to central hub 854 and strap 866 may be extended between central hub 854 and an anchor point on flatbed trailer 864, whereby the length of straps 856 and 866 may be adjusted using adjustment mechanisms (e.g., ratchet or clamp mechanisms 858 and 868, respectively) to bring tarp flap 860 into securement against the payload (not shown). A similar endpoint fastening system may be deployed on the opposite side of the payload (not shown). Accordingly, the front end of the payload may be protected from environmental conditions (e.g., wind, rain, sleet, snow and sunlight).

Other aspects and embodiments of the present invention will be apparent to those skilled in the art from consideration of the specification and practice of the invention disclosed herein. For example, the composition (e.g., a stainless steel alloy and zinc-plated mild steel) of the connection pins and other components of the tarp fastening devices of the present invention may be selected to provide the appropriate amount of tensile strength and resistance to environmental conditions, yet maintaining the appropriate amount of flexibility and strength as may be required for a given application. It is intended, therefore, that the specification and illustrated embodiments be considered as examples only, with a true scope and spirit of the invention being indicated by the following claims.

What is claimed is:

1. A tarp fastening system, comprising:
   a flatbed trailer, including
      at least one mechanical support structure;
      a rubrail;
      a payload; and
      a tarp arranged to cover the payload; and one or more tarp fastening devices removably coupled to the at least one mechanical support structure, each of the one or more tarp fastening devices including, a support frame;

a spool coupled to the support frame;

an interconnecting line cord coupled to the spool;

a plurality of connection pins coupled to the interconnecting line cord; and a gear assembly coupled to the spool, wherein the plurality of connection pins are removably coupled to the tarp and the rubrail and the gear assembly is configured to retract the interconnecting line cord into the spool to secure the tarp to the payload.

2. The tarp fastening system of claim 1, wherein the at least one mechanical support structure includes a stake pocket.

3. The tarp fastening system of claim 2, wherein the support frame includes a latching mechanism configured to maintain a position of the support frame within the stake pocket.

4. The tarp fastening system of claim 3, wherein the latching mechanism includes a locking mechanism and a spring.

5. The tarp fastening system of claim 2, wherein the support frame includes a locking pin configured to maintain a position of the support frame within the stake pocket.

6. The tarp fastening system of claim 1, wherein the connection pins are configured to exert a force onto the rubrail to maintain a position of the connection pins on the rubrail.

7. The tarp fastening system of claim 1, further comprising an anchor mechanism coupled to an end point of the interconnecting line cord.

* * * * *